(12) United States Patent
Kocker-Kunz (10) Patent No.: US 9,253,972 B2
(45) Date of Patent: Feb. 9, 2016

(54) DEVICE FOR DRIVING AWAY BIRDS BY MEANS OF ACOUSTIC OSCILLATION

(76) Inventor: Susanne Kocker-Kunz, Basel (CH)

( * ) Notice: Subject to any disclaimer, the term of this patent is extended or adjusted under 35 U.S.C. 154(b) by 363 days.

(21) Appl. No.: 13/876,257

(22) PCT Filed: Sep. 27, 2010

(86) PCT No.: PCT/EP2010/064253
§ 371 (c)(1),
(2), (4) Date: Jun. 10, 2013

(87) PCT Pub. No.: WO2012/041361
PCT Pub. Date: Apr. 5, 2012

(65) Prior Publication Data
US 2013/0239876 A1    Sep. 19, 2013

(51) Int. Cl.
*A01M 29/18*    (2011.01)
*A01M 29/16*    (2011.01)

(52) U.S. Cl.
CPC ............... *A01M 29/18* (2013.01); *A01M 29/16* (2013.01)

(58) Field of Classification Search
CPC ............................. A01M 29/16; A01M 29/18
USPC ....................... 116/22 A; 340/573.2; 367/139
See application file for complete search history.

(56) References Cited

U.S. PATENT DOCUMENTS

| | | | | |
|---|---|---|---|---|
| 5,450,063 | A * | 9/1995 | Peterson et al. | 340/573.2 |
| 6,166,996 | A * | 12/2000 | Grissom et al. | 367/139 |
| 6,407,670 | B1 * | 6/2002 | Dysarsz et al. | 340/573.2 |
| 8,616,144 | B2 * | 12/2013 | Yifrach | 116/22 A |

FOREIGN PATENT DOCUMENTS

| | | |
|---|---|---|
| CH | 440821 A | 7/1967 |
| DE | 2708298 A1 | 9/1977 |
| DE | 202006015798 U1 | 12/2006 |
| EP | 0037109 A1 | 10/1981 |
| GB | 1517493 | 7/1978 |
| WO | WO 2004093537 A1 * | 11/2004 ............ A01M 29/18 |

OTHER PUBLICATIONS

International Search Report (ISR) published May 4, 2012 for International Patent Application No. PCT/EP2010-064253 (with English translation).

(Continued)

*Primary Examiner* — Richard A Smith
(74) *Attorney, Agent, or Firm* — Paul D. Bianco; Fleit Gibbons Gutman Bongini & Bianco PL (57) ABSTRACT

A device for subjecting a spatial area to acoustic oscillation in the ultrasound range or the ultrasound near range, the device provided with a housing having a plurality of irradiation surfaces wherein cylindrical cavities are formed as resonator spaces. The housing has a cylindrical inner space and is penetrated by a rotationally fixed vertical axis divided into two. The first part of the shaft is formed by an outer bearing flange and an inner bearing flange with distancing bolts screwed thereinbetween, and an electrical motor and a reduction gear arranged between the two bearing flanges. The second part of the shaft is formed by a pot-shaped sleeve to which a collector ring is fixed, a current collector lying on the collector ring in a sliding manner and connected to the rotating housing. Lines lead from the current collector through a borehole into the resonator space.

21 Claims, 5 Drawing Sheets

(56) References Cited

OTHER PUBLICATIONS

Written Opinion published Mar. 27, 2013 for International Patent Application No. PCT/EP2010-064253 (with English translation).

International Preliminary Report (IPR) published Apr. 2, 2013 for International Patent Application No. PCT/EP2010-064253 (with English translation).

* cited by examiner

DEVICE FOR DRIVING AWAY BIRDS BY MEANS OF ACOUSTIC OSCILLATION

FIELD OF THE INVENTION

The present invention relates to a device for driving away birds by subjecting a space to sound vibrations in the ultrasonic or near-ultrasonic range, comprising at least one resonator for emitting the sound vibrations, wherein the at least one resonator is rotatably mounted in a holder.

BACKGROUND

The use of ultrasonic waves for driving away small rodents, such as rats and mice is already known from CH-A 440 821. Here, the sensitive region is still specified to be very wide, namely between 15 and 100 kHz. Over the years, investigations have increasingly been carried out and in particular work has also been carried out by means of sound vibrations in the ultrasonic or in the near-ultrasonic range in order to thereby drive away birds or keep the same away from a space. According to the document DE-A-2708298 one was in this case of the opinion that a plurality of resonators which operate in various resonant frequencies would be necessary in a device to this end, wherein one has overlaid and modulated these signals. In particular, one was convinced that a habituation effect can hereby be prevented. In this device for shying away birds, the at least two sound resonators were arranged above one another in the same radiation direction in a so-called revolving tower, so that a space around the revolving tower should be reachable by means of emission which is as flat as possible and with a sphere of action which is as large as possible. Such devices have been used in particular in agriculture. The sphere of action is on the one hand determined by the sound intensity, but environmental conditions also further influence this sphere of action. These particularly include the geographic structure, planting in the region exposed to sound and also in particular the air movements present.

The high outlay in terms of device technology is only worthwhile however in the case of a bird population which is not characterised by constant alternation of large and small species. The latter necessitates a high outlay in terms of control and sweeping over relatively large frequency ranges, so that "pauses" are created, in which the bird species not affected in each case can settle.

In a later application, the same applicant has stated their earlier considerations and investigations more precisely. Here, they have determined that practically all birds react to frequencies in the range between 20 and 26 kHz. Added to this is the fact that they have determined that the modulation of the sound vibrations acts on the plumage of the bird. Today, one assumes that the perception of the low-frequency vibrations by means of the plumage is a warning system for the birds with respect to a possible attack from the air. The high-frequency sound vibrations lead to vibrations of the skull bone, so that a bird which penetrates a space exposed to sound in such a manner immediately reacts to this in flight and turns around. Practically all devices present on the market today for driving away birds operate in accordance with these principles.

Furthermore, EP-B-0037109 discloses an apparatus for driving away birds and small rodents by exposing at least one space to a first sound vibration, wherein this first sound vibration is modulated with at least one second, low frequency sound vibration, wherein the apparatus comprises a resonator for emitting the sound vibrations, which is rotatably mounted and driven about two shafts which are arranged at an angle with respect to one another. The low frequency component in particular should be perceived via the plumage as disturbing.

Preferably, the space to be exposed to sound should be passed over by the rotating apparatus in as gapless a manner as possible. At or on buildings, the space which can be passed over thereby is structurally limited however.

Since the 70s, these devices have been used much more in cities for building protection, so that the façades of buildings remain spared from bird droppings. Building façades often have a decidedly complex structure and the covering exposure of such a façade to sound is relatively complex. In order to protect such a façade such as for example of historic buildings, such as churches, train stations, castles, etc., a multiplicity of such devices is required. A purely flat emission, as was also possible with the devices according to DE-A-2708298, could in this case no longer be sufficient. Accordingly, one has built this device in accordance with the here interesting closest prior art of EP-0 037 109. Here, a single resonator on the one hand was rotated about a horizontal shaft, which one holds securely in a fork-shaped holder, whilst the fork-shaped holder itself rotates about a vertical shaft. These devices have now been in use for more than years and the maintenance thereof is relatively unproblematic, but just the drive belt has to be replaced from time to time and the devices have to be cleaned and lubricated. Depending on the installation location, one today assumes a maintenance period of approximately 3 to 5 years.

In addition to the complex façade structures, a further problem is the necessary energy supply to the installation locations of the devices. Particularly at historical buildings, one is consequently motivated to place such devices as little as possible and in as unobtrusive a manner as possible, in order to not influence the external appearance and to have a wiring outlay which is as low as possible. Thanks to the resonator, which is rotated about an x-axis on the one hand and about a y-axis on the other hand, a space in front of a façade can now be comprehensively protected. As a result, even the approach of the birds is prevented. It is however problematic that the rotation itself should not have too high a speed about the horizontal axis nor about the vertical axis, as otherwise the sound pattern is too strongly disturbed and loses its effect. In other words, one has determined that at higher rotational speed, although the spatial sound coverage is improved in that barely any birds penetrate the space exposed to sound any more, at the same time the sphere of action has as a result been reduced in size. Due to the increased rotational speed, although it has consequently been prevented that birds settle on a façade protected in such a manner even only for a short time or even also only come within a close area, on the other hand more remote areas were barely still effectively protected. Accordingly, it was necessary to increase the density of the devices on the façade, this has however led to increased costs, to aesthetic problems on listed façades and the higher rotational speed has additionally substantially shortened the maintenance interval. The faster rotating devices must in part be maintained again after one to two years.

SUMMARY OF THE INVENTION

A device for driving away birds is disclosed, which device retains the increased spatial coverage, whilst the range should at the same time be increased again and additionally the maintenance period should be lengthened again.

The device has a housing in which at least one resonator is arranged distributed evenly around the circumference in the direction of rotation, wherein the housing is mounted on a rotationally fixed shaft in which an electric motor and a gear box are arranged, and the output drive of the gear box acts on the housing and sets the same into rotational movement, wherein the supplying of the resonators and the electric motor takes place through the rotationally fixed shaft.

Thanks to the housing, a plurality of resonators can be arranged distributed in the direction of rotation on the circumference, so that a substantially lower rotational speed is required and at the same time the succession of exposure to sound can be kept high.

Thanks to the arrangement of the drive in the housing itself, this drive is best protected and virtually immune to environmental influences. Thanks to the smaller rotational speed of the individual resonators, a distortion of the signal is reduced and thus the effective range is increased. Thanks to the increased range, consequently fewer devices need to be attached on a façade, which is necessary in particular in terms of saving costs, but above all also aesthetically.

Likewise, in particular birds of different size, such as e.g. sparrows or pigeons on the one hand and crows, gulls or geese on the other hand, should be driven away and a driving away of variously sized bird species over as large a space as possible, preferably at and/or on buildings or other structures should be enabled with a low outlay.

By controlling at least one ultrasonic resonator via a ring main or bus line, on the one hand it is possible to program the resonator via this line and on the other hand, the control outlay is kept low, as the actual control of the resonator is arranged in the housing itself and in the programmed state only the energy supply additionally takes place externally via line. This itself allows the arrangement of approx. 50-100 resonators over a distance of up to 1000 m. The resonators are flexibly and separately and also inherently controllable. This allows an up to 60% higher efficiency of the apparatus, as the resonators can be operated, preferably can be pivoted in one and/or two dimensions, by corresponding programming simultaneously or at variable intervals.

The resonator forms a separate unit.

A further advantage turns out to be the possibility of a simple temperature adjustment, as otherwise the emitted frequencies fluctuate as a function of temperature (lower temperatures for example require higher energy supply in order to prevent a dropping of the frequency).

Previous apparatuses require a permanent, external and central control of the resonators and/or the resonators could only be operated temporally successively, which additionally limited the distance of the control box to approx. 100 m.

Depending on the bird species to be expected, a plurality of resonators can be controlled with just one control unit. Variously sized bird species can be influenced at various locations, e.g. smaller birds on window cornices and larger birds on roofs or sculptures.

Instead of modulating frequencies of the resonators as in the prior art, constant frequencies are programmed and used (depending on bird size). In addition, empirical values can have an influence following observation.

Preferred is a frequency range of 20-26 kHz. It is known in this case that the required frequency is inversely proportional to bird size.

Further advantageous embodiments of the device according to the invention are disclosed and the meaning and effect thereof is explained in the following description with reference to the attached drawings. A preferred exemplary embodiment of the subject of the invention is illustrated in the drawings and described in detail in the following.

DETAILED DESCRIPTION

Figure 3:
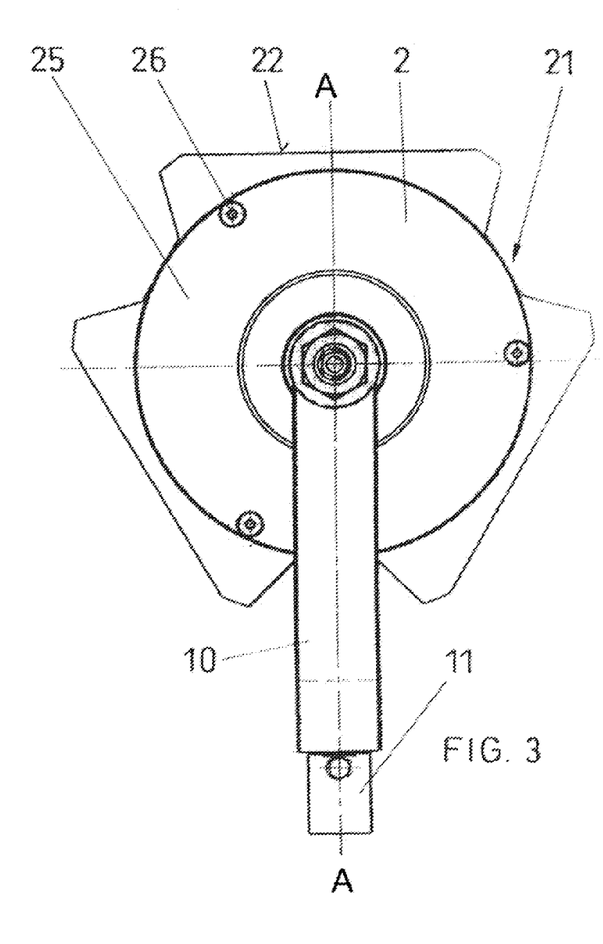
FIG. 3 shows a side view of the preferred embodiment of the device and FIG. 4a shows a perspective isometric illustration of the same device.
Figure 4A:
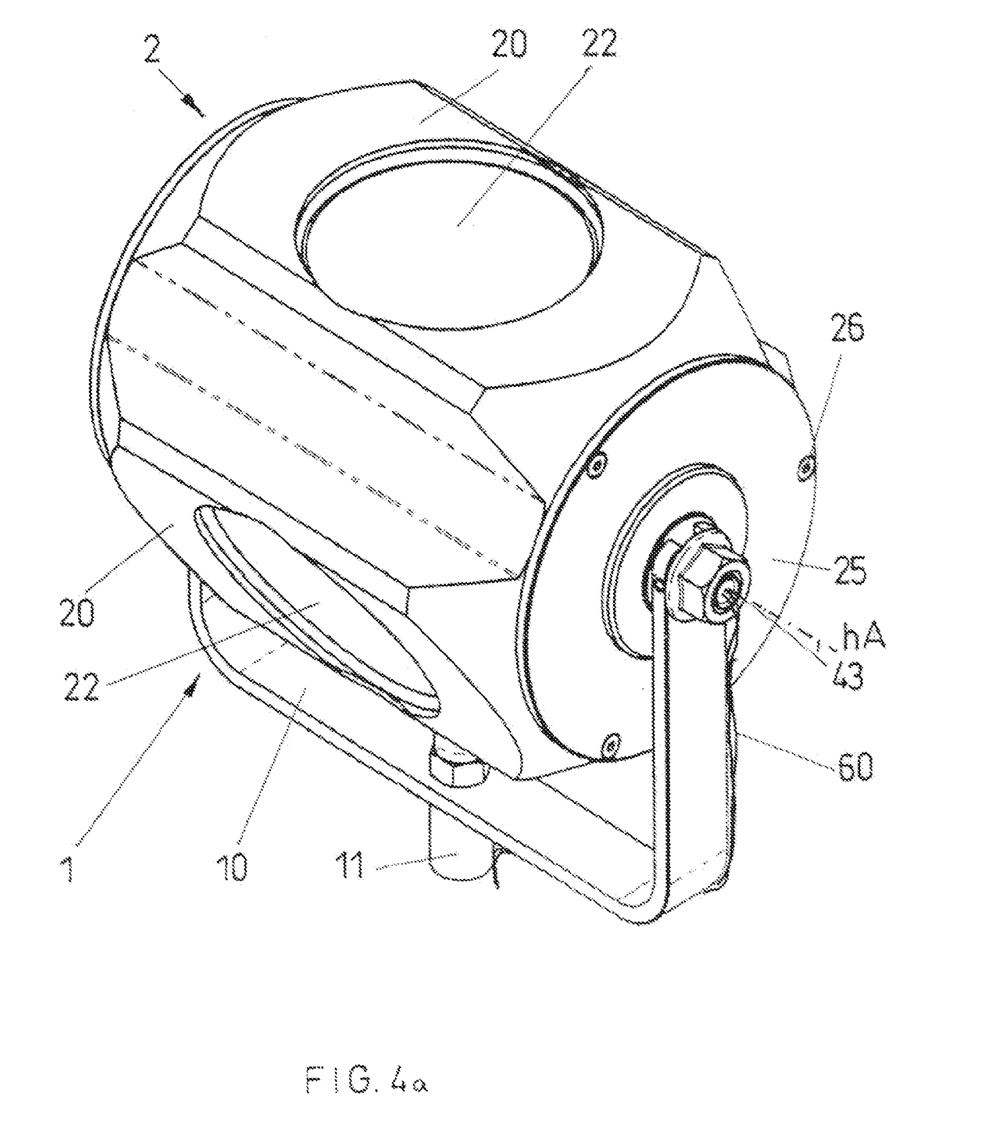
Figure 4B:
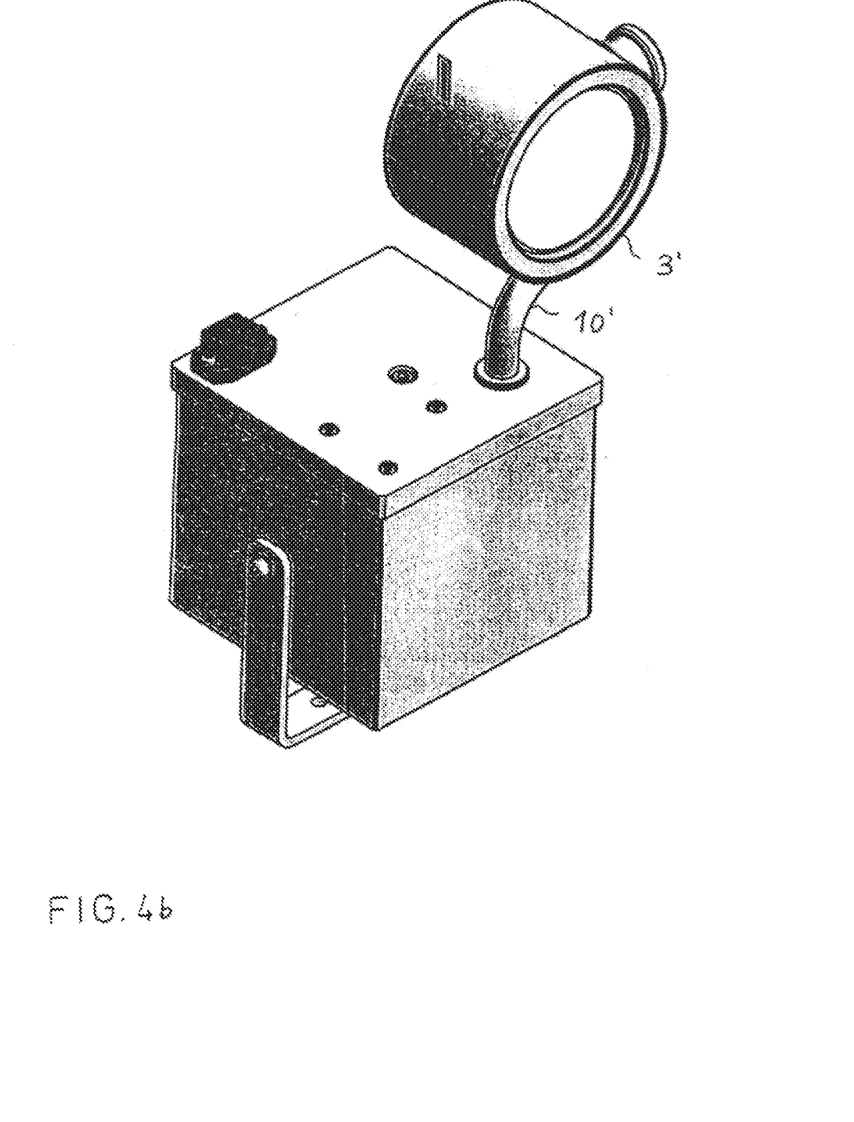
FIG. 4b shows a device with swan neck and a resonator.

The general structure of the device according to the invention for driving away birds by subjecting a space to sound vibrations in the ultrasonic or in the near-ultrasonic range can be seen most clearly in the views according to FIGS. 3 and 4a. The device as a whole is designated with 1. It comprises a housing 2 in which a plurality of resonators 3 are accommodated and also a fork-shaped holder in which the housing 2 is held. This fork-shaped holder 10 or a swan neck 10' can itself likewise be mounted rotatably and/or pivotably, so that the resonators can be rotated simultaneously about two shafts running perpendicularly to one another. For pure façade coverage however, the rotation about the horizontal shaft, which is held in the forked holder or swan neck, is sufficient. Here, the horizontal shaft does not mean an absolutely horizontal shaft, but rather is meant as relative information. Depending on the mounting, in this case, the so-called horizontal shaft can definitely assume any other desired position. If the device is for example mounted on a façade in such a manner that the holder shaft 11, on which the fork-shaped holder 10 is held, mounts perpendicularly to the façade, then the fork-shaped holder 10 can be rotated in a plane parallel to the façade and the horizontal shaft would then rotate in just such a plane running parallel thereto. The housing 2 always rotates about this horizontal axis hA.

Figure 1:
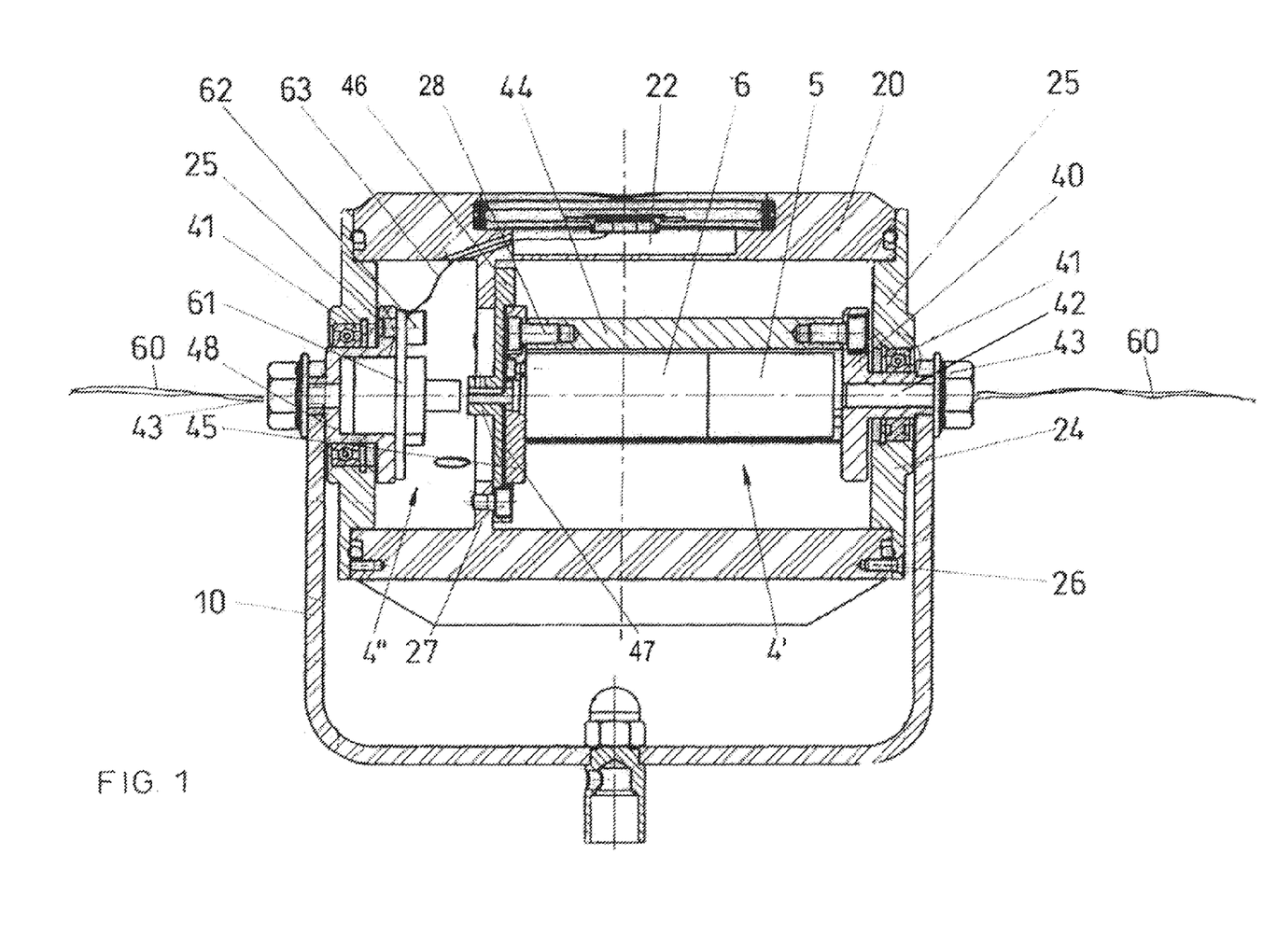
FIG. 1 shows a longitudinal section through the device according to the invention through the central horizontal shaft and FIG. 2 shows a further vertical section through the same exemplary embodiment of the subject of the invention perpendicularly to the horizontal axis of rotation of the line A-A in FIG. 3.
Figure 2:
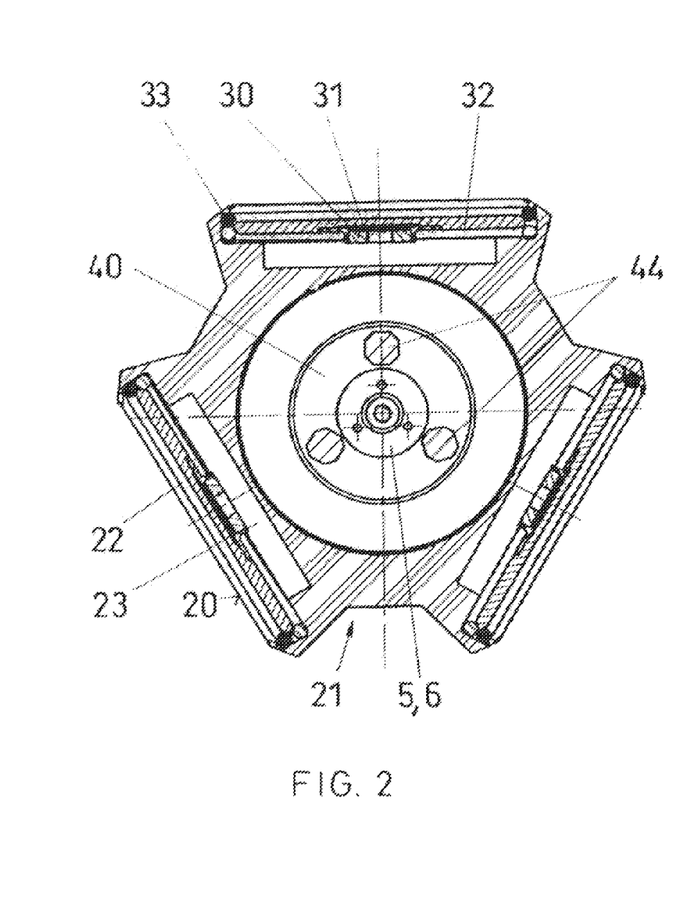
Figure 2A:
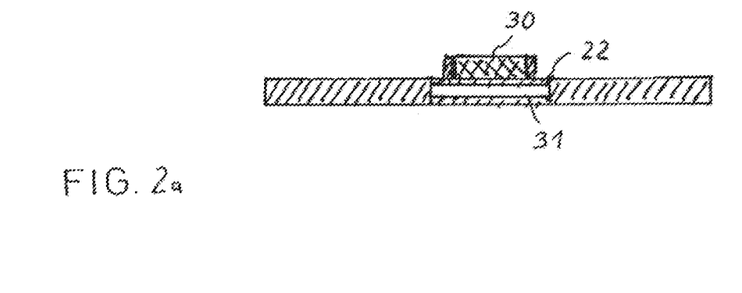
FIG. 2a shows a resonator.

The housing 2 essentially has the shape of a multi-sided cylinder, wherein the number of cylinder sides is equal to the number of resonators 3. In the present example, the housing 2 is practically provided with three side faces and only the region between the longitudinal side edges is cut away in this case in order on the one hand to reduce the volume and on the other hand to save weight and also to enlarge the surface in order to possibly be able to dissipate a certain heating by means of a surface which is as large as possible. Whilst the outer face of the housing 2 therefore has three side faces here, corner grooves 21 are present between these side faces 20. Cylindrical cavities 22 are milled in the side faces 20. The resonators 3 are arranged in these cylindrical cavities 22 elastically and such that they are kept sealed. The cylindrical cavities 22 have an inner core cavity 23 and here the electrical exciter circuit, which is not illustrated in detail here however, can be accommodated in this core cavity. This exciter circuit acts on a vibration quartz 30 which passes its vibrations onto a membrane 31. The membrane 31 transmits these vibrations in turn to a vibration plate 32 which is movably mounted via O rings 33 in the widened region of the cylindrical cavity 22.

The housing 2 has a cylindrical interior 24. This cylindrical interior 24 is closed on both sides by a screwed-on lid 25. The screws 26 are used for fastening this lid 25 on the housing 2.

Due to their function, the side faces 20 of the housing 2 are termed emission faces in the following and the cylindrical cavities 22 are termed resonator space.

A circular hole is formed centrally in the circular lid 25, in which an outer bearing flange 40 is mounted in the lid 25 by means of a ball bearing 41. This bearing flange 40 has a hollow pin 42, into which a banjo screw 43 is screwed. This banjo screw 43 is used for the non-positive holding of the device 1 in the fork-shaped holder 10. In the example illustrated, three distance bolts 44 are screwed on the outer bearing flange 40, which are connected on the opposite sides to an inner bearing flange. Between the outer bearing flange 40 and the inner bearing flange 45 and also between the distance bolts 44, there therefore remains a type of cage-shaped space and an electric motor 5 and a gear box 6, namely a reduction gear, are arranged in this space one behind the other. The two bearing flanges 40 and 45 and also the distance bolts 44 therefore form a first part of a rotationally fixed shaft which is divided in two. This first part of the rotationally fixed shaft is designated with 4'. Whilst the rotating housing 2 is mounted on a ball bearing in the case of an external bearing flange 40, the inner flange 45 is mounted such that it is held centred in a sliding bearing plate. This sliding bearing plate has a cylindrical cavity, to the size of which the size of the inner bearing flange 45 corresponds with slight play. The sliding bearing plate 46 is securely connected to the housing 2. The sliding bearing plate 46 has a hollow pin 47 and the output drive of the housing 6 engages into this hollow pin 47 and is securely connected to this hollow pin 47 by means of a fixing screw and thus drives the sliding bearing plate 46 which is peripherally screwed to the housing 2. To this end, the housing 2 has a radially inwardly directed peripheral annular wall 27. This annular wall 27 is integrally connected to the housing 2.

The electric motor 5 is fed via supply lines 60. These supply lines 60 can readily supply directly to the electric motor through the banjo screw 43 and the external bearing flange 40 or the hollow pin 42 thereof.

An identical lid 25 is present on the opposite side, which likewise has a central hole and a pot-shaped sleeve is held in this central hole, which in turn is mounted rotatably by means of a ball bearing with respect to the lid and thus with respect to the housing 2. The pot-shaped sleeve 48 has a peripheral collar 49 at the open end. An electrical slip ring 61 is fixed in an insulated manner on this peripheral collar 49 directed towards the interior of the housing. A voltage is applied at this slip ring 61, which in turn is conveyed from the outside inwards by means of supply lines 60 through a corresponding banjo screw 43. The current collector 62 is fixedly connected to the rotating housing 2, so that the current collector 62 slides on the electrical slip ring 61. Electrical lines 63 lead from the current collector 62 to the electronic circuit, which lines excite the vibration quartz 30.

The entire cylindrical interior 24 is divided by the sliding bearing plate 46 and the peripheral annular wall 27 into two spaces, wherein the first space is termed the drive space, in which the already mentioned first part of the rotationally fixed shaft, which is divided in two, is located, whilst the second space is termed the supply space, in which the second part of the rotationally fixed shaft 4', which is divided in two, is located with the sliding ring and the current collector. A bore 28 leads from the supply space into the resonator space 22.

Important advantages are achieved thanks to this unusual shaping of the device according to the invention for driving away birds by subjecting a space to sound vibrations in the ultrasonic or in the near-ultrasonic range. Thanks to a plurality of resonators which are arranged one behind the other in the direction of rotation, for a constant rotational speed, the corresponding space is subjected to ultrasound three times more often. Thanks to this, it is achieved that the birds turn around as soon as in the approach to a building and do not settle there for a short time in order to fly away again. Were one to operate with a single resonator, then although the constructive outlay would be substantially smaller, one would have to increase the rotational speed. This would however immediately lead to the wear parts being subject to a higher wear and as practical experiments have shown, the effective radius consequently reduces by up to a third. Consequently, about nine times more devices must be attached to cover an identical façade area, with the corresponding wiring outlay. This problem of the wiring outlay was simultaneously reduced in that unlike before where all devices were operated from one control device with the corresponding signals, in that now the actual circuit is rather accommodated directly in the resonator space. This is readily possible with the today conventional integrated circuits which can be obtained cost effectively on the market. Thanks to the invention, a more efficient device is therefore achieved which has a longer service life, a larger sphere of action and as a consequence saves costs as a whole during operation.

In the present case, talk has for the most part concerned the fact that the device according to the invention is used for subjecting building façades to sound. This is one of the most common applications. At the same time, however, such devices are also used to keep gulls away from yachts or other boats. The cleaning costs to be saved as a result are enormous.

Figure 5:
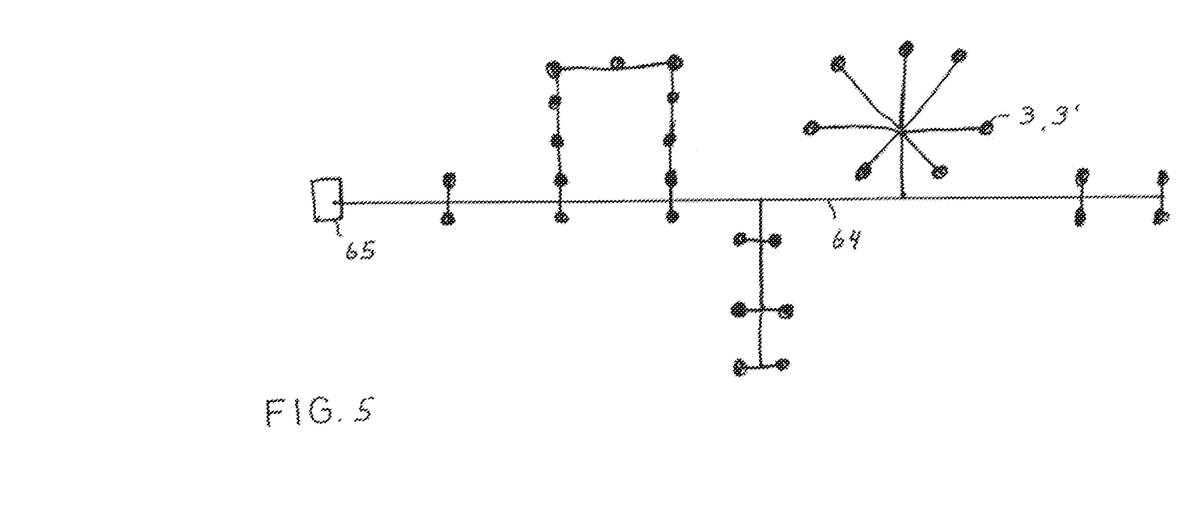
FIG. 5 shows an arrangement of devices according to the invention.

Furthermore, such devices can of course also be used in agricultural regions, for example in viticulture regions or in cherry trees. In contrast with the conventional nets, birds are not injured in this case, residents are likewise not so bothered as in the case of so-called bird cannons. Finally, with such devices, the regions of airports can also better be secured in order thereby to substantially prevent so-called bird strikes. The arrangement in the chosen example comprises three ultrasonic resonators 3' which are arranged in a two-dimensionally pivotable manner at various points of a building (window cornice, roof region). These ultrasonic resonators 3' are connected to a control unit 65 and to one another via BUS line 64. Starting from the insight that certain building parts are by preference approached by bird species of "fitting" size, the ultrasonic resonators 3' are programmed to the frequencies effective on the same. As a result, the emission of a wider frequency band with ineffectual frequencies is avoided, so that the respective bird species are continuously scared away. The control unit 65 is also suitable for undertaking temperature-dependent frequency adjustments (thus e.g. a frequency of 22.5 kHz at 18° C. drops to approx. 20 kHz at −20° C.) in order to be able to emit frequencies effective in all weather conditions.

REFERENCE LIST

1 Device
2 Housing
3 Resonators
3' Ultrasonic resonator
4 Rotationally fixed shaft
5 Electric motor
6 Gear box
10 Fork-shaped holder
10' Swan neck
11 Holder shaft
20 Side faces or emission faces
21 Corner grooves
22 Cylindrical cavity or resonator space 23 Core cavity
24 Cylindrical interior
25 Screwed-on lid
26 Screws
27 Annular wall
28 Bore
30 Vibration quartz
31 Membrane
32 Vibration plate
33 O ring
40 External bearing flange
41 Ball bearing
42 Hollow pin
43 Banjo screw
44 Distance bolt
45 Inner bearing flange
46 Sliding bearing plate
47 Hollow pin
48 Pot-shaped sleeve
49 Peripheral collar
60 Supply lines
61 Slip ring
62 Current collector
63 Electrical lines to resonators
64 BUS line
65 Control unit

The invention claimed is:

1. A device (1) for driving away birds by subjecting a space to sound pressure or to sound vibrations in the ultrasonic or near-ultrasonic range, comprising at least one resonator (3) for emitting the sound vibrations, wherein the at least one resonator (3) is rotatably and/or pivotably mounted on or in a holder (10), wherein the device (1) has a housing (2) in which at least one resonator (3) is arranged, wherein the housing (2) is mounted on a rotationally fixed shaft (4) in which an electric motor (5) and a gear box (6) are arranged, wherein an output drive of the gear box acts on the housing (2) and sets the same into rotational movement, wherein the supplying of the resonators (3) and the electric motor takes place through the rotationally fixed shaft (4), and wherein each of the at least one resonator (3) is arranged in a resonator space (22).

2. The device according to claim 1, wherein the holder (10) is fork-shaped and the at least one resonator comprises two resonators (3) are arranged in the housing (2), the two resonators distributed evenly around the circumference in the direction of rotation.

3. The device (1) according to claim 1, wherein the rotationally fixed shaft (4) is divided in two (4', 4"), wherein the first part (4') of the shaft (4) consists of an inner (40) and an external (45) bearing flange, wherein the bearing flanges are connected to one another via distance bolts (44), so that the electric motor (5) and the gear box (6) are held centrally and axially one behind the other between the bearing flanges (40, 45).

4. The device (1) according to claim 3, wherein a radially inwardly directed peripheral annular wall (27) is formed on the housing (2) in the cylindrical interior (24) of the housing (2), and wherein a sliding bearing plate (46) is fastened on the housing (2), in which the inner bearing flange (45) of the first part (4') of the shaft (4), which is divided in two, runs.

5. The device (1) according to claim 4, wherein the output drive of the gear box (7) penetrates the inner bearing flange (45) and drives the sliding bearing plate (46), which is connected to the annular wall (27) of the housing (2) in a rotationally fixed manner.

6. The device (1) according to claim 4, wherein the interior (24) of the housing (2) is divided by the annular wall (27) and the sliding bearing plate (46) into a drive space (4') and a supply space (4").

7. The device (1) according to Claim 6, wherein one bore (28) in each case leads from the supply space (4") into each resonator space (22).

8. The device (1) according to claim 6, wherein the current collector (62) is held within the supply space (4") such that it is connected to the housing (2).

9. The device (1) according to claim 3, wherein the outer bearing flange (40) which adjoins the lid (25) of the housing (2) has a bearing pin (42) formed on, which is penetrated by a banjo screw (43), by means of which the housing (2) is fastened in the fork-shaped holder (10) and through which the supply lines (60) for the electric motor (5) are guided.

10. The device (1) according to claim 3, wherein the second part (4") of the rotationally fixed shaft (4), which is divided in two, has a pot-shaped sleeve (48) with a peripheral collar (49) at the open end, the peripheral collar (49) of which is internally connected to the lid (25) which it penetrates and is connected by a banjo screw (43) to the fork-shaped holder (10).

11. The device (1) according to claim 10, wherein an electrical slip ring (61) is held in an insulated manner on the peripheral collar (49), which is electrically connected to a supply line (60) which is inserted through the banjo screw (43).

12. The device (1) according to Claim 11, wherein current collectors (62) rest on the slip ring (61), which convey the current via a line (63) into the resonator spaces (22).

13. The device (1) according to claim 1, wherein the at least one resonator comprises a plurality of resonators and wherein the housing has a hollow cylindrical interior (24) and externally distributed evenly over the circumference, emission faces (20) are present, in which in each case one of the plurality of resonators (3) is arranged in a recessed resonator space (22).

14. The device according to claim 13, wherein the interior (24) of the housing (2) is closed on both sides by a screwed-on lid (25) and the rotationally fixed shaft (4) is mounted in the lids (25).

15. The device (1) according to claim 1, wherein the resonator (3) is provided with a vibration quartz (30) accommodated in a pan, wherein a membrane (31) is mounted in front of the vibration quartz (30) in a spaced manner forming a cavity.

16. An arrangement for driving away birds, in particular birds of different sizes by subjecting at least one space to sound pressure or to ultrasonic or near-ultrasonic vibrations by the device according to claim 1, wherein
the at least one resonator (3) is a self-controlling ultrasonic resonator (3') which is connected by a ring main or BUS line (64) to a power supply and control unit (65).

17. The arrangement according to claim 16, wherein the at least one resonator (3) comprises two ultrasonic resonators (3'), which are connected to one another by the BUS line (64).

18. The arrangement according to claim 17, wherein the ultrasonic resonators (3') are arranged at different locations spaced apart from one another.

19. The arrangement according to claim 17, wherein each ultrasonic resonator (3') forms a separate unit.

20. The arrangement according to claim 16, wherein the spacing or the length of the line (64) is up to 1000 m.

21. The device according to claim 1, wherein the at least one resonator comprises two resonators (3) arranged in the housing (2), and the holder for each of the two resonators (3) is arranged as a swan neck (10').

\* \* \* \* \*

UNITED STATES PATENT AND TRADEMARK OFFICE
CERTIFICATE OF CORRECTION

PATENT NO. : 9,253,972 B2  
APPLICATION NO. : 13/876257  
DATED : February 9, 2016  
INVENTOR(S) : Susanne Kocher-Kunz Page 1 of 1

It is certified that error appears in the above-identified patent and that said Letters Patent is hereby corrected as shown below:

On the title page  
Name of the Inventor,  
Item [76], correct the name of the inventor from Susanne Kocker-Kunz to:

-- Susanne KOCHER-KUNZ --

Signed and Sealed this  
Ninth Day of August, 2016

Michelle K. Lee  
*Director of the United States Patent and Trademark Office*